United States Patent [19]

Yonezawa et al.

[11] Patent Number: 4,881,376

[45] Date of Patent: Nov. 21, 1989

[54] ADSORPTION REFRIGERATION SYSTEM

[75] Inventors: Yasuo Yonezawa, Nara; Masao Matsushita, Hirakata; Kenzo Oku, Kyoto; Hiroki Nakano, Neyagawa; Shin-ichi Okumura, Ootsu; Motoshi Yoshihara, Yawata; Akiyoshi Sakai, Toyonaka; Atsushi Morikawa, Minoo, all of Japan

[73] Assignee: Nishiyodo Air Conditioner Co., Ltd., Osaka, Japan

[21] Appl. No.: 158,294

[22] Filed: Feb. 19, 1988

[30] Foreign Application Priority Data

Aug. 28, 1987 [JP] Japan .................... 62-216140
Aug. 28, 1987 [JP] Japan .................... 62-131725[U]

[51] Int. Cl.$^4$ ............................................. F25B 17/00
[52] U.S. Cl. ........................................ 62/106; 62/476; 62/480
[58] Field of Search .......... 62/480, 106, 476, DIG. 21

[56] References Cited

U.S. PATENT DOCUMENTS

| 4,228,845 | 10/1980 | Cowling | 62/DIG. 21 |
| 4,610,148 | 9/1986 | Shelton | 62/106 X |
| 4,637,218 | 1/1987 | Tchernev | 62/480 X |
| 4,754,805 | 7/1988 | Rothmeyer | 62/480 X |
| 4,765,395 | 8/1988 | Paeye et al. | 62/480 X |

FOREIGN PATENT DOCUMENTS 57-80158 5/1982 Japan .
60-11072 1/1985 Japan .

*Primary Examiner*—Lloyd L. King
*Attorney, Agent, or Firm*—Flynn, Thiel, Boutell & Tanis

[57] ABSTRACT

An adsorption refrigeration system comprising adsorption columns housing a solid adsorbent and heat transfer tubes and sealed with a refrigerant, an evaporator, a condenser, and pipe lines connecting them together so that the refrigerant may be circulated, the pipe lines being equipped with valves, preferably, butterfly valves, capable of opening or closing by means of internal pressure difference between the evaporator side and condenser side and driving force of eccentric valve shafts. The system is operated by alternatively changing over adsorption and desorption stages between the one adsorption column(s) and the other column(s) so that both columns may be at mutually reverse stages; shortly before change-over, transferring whole amount of heat remained in the one column(s) immediately before shifting from desorption to adsorption stage to the other column(s) immediately before shifting from adsorption to desorption stage where the preheat the adsorbent and then reversing the stages. The evaporator preferably comprises heat transfer tubes for passage of a heating medium on a utilization side arranged in multi-stage, evaporating plates holding the refrigerant liquid in which each stage of the tubes are partly immersed, and overflow members for adjusting the liquid level, whereby evaporating ebullition occurs briskly.

15 Claims, 8 Drawing Sheets

ADSORPTION REFRIGERATION SYSTEM

BACKGROUND OF THE INVENTION

1. Field of the Invention

This invention relates to an effective adsorption refrigeration system which takes advantage of adsorption and desorption actions of a refrigerant by a solid adsorbent to perform refrigerating operation or heat pump operation. More particularly, it relates to an adsorption refrigeration system which is operated by transferring a heat transfer medium for heating an adsorbent, etc. remained in a first adsorption column immediately before shifting from a desorption stage to an adsorption stage, to a second adsorption column immediately before it comes into a desorption stage thereby to preheat the adsorbent, thus availing itself of the residual heat and enhancing a system efficiency.

2. Statement of Related Art

Adsorption refrigerators which take advantage of adsorption and desorption actions of a refrigerant by a solid adsorbent to generate cold or heat or to perform heat pump operation are known in the art and advantageous in that low-grade heat sources (e.g. warm water in the neighborhood of 85° C.) such as warm water obtained from solar collectors etc., or waste heat made available from works can be harnessed effectively and that each of them is made up of a smaller number of mobile components such as pumps, being more economical in respect of apparatus cost, and operational noise is smaller, as compared with compressor type refrigerators.

In a known adsorption refrigerator of this type, two sets of adsorption columns housing therein a solid adsorbent such as silica gel, zeolite, activated charcoal, activated alumina, etc. are installed in parallel and are systematized so that a heat transfer medium for heating the adsorbent and cooling water may be supplied alternately to both adsorption columns to repeat adsorption and desorption stages whereby refrigerating power output can be continuously obtained. For example, U.S. Pat. No. 4,610,148 discloses a heat pump system under this category.

With such an adsorption refrigerating system, however, when adsorption and desorption stages are changed over, warm water remaining within the one adsorption column, which has just finished a desorption stage, is forced out by cooling water for shifting the column to an adsorption stage and discarded to a cooling water generator such as a cooling tower, for which a packing material fragile to heat, e.g. rigid polyvinyl chloride is used. As a consequence, the packing material exposed to the warm water is degraded early and whole amount of the warm water in the adsorption column used for desorption is discarded without heat recovery, which causes significant heat loss and results in reduction of the system efficiency by that loss.

Further, adsorption refrigerators of a kind that the evaporator is full of a working fluid in which heat transfer tubes are wholly immersed are also known and disclosed in, for example, Japanese patent publication A1 60-11072 (1985), Japanese patent publication No. A1 57-80158 (1982), etc. In this case, however, pressure of the working fluid always acts upon the exterior faces of the heat transfer tubes, and consequently, ebullition on the surfaces is difficult to occur and sufficient system efficiency could not be obtained.

SUMMARY OF THE INVENTION

In order to overcome these problems and disadvantages associated with the prior art, this invention has for a primary object to provide an adsorption refrigeration system operable with good system efficiency without heat loss.

Another object of this invention is to provide an adsorption refrigeration system that is operated in a manner of protecting a packing material of a cooling water generator.

A further object of this invention is to provide an adsorption refrigeration system with which cooling efficiency of an evaporator is enhanced.

According to one aspect of this invention, there is provided a method of operating an adsorption refrigerating system comprising a plurality of adsorption columns housing therein a solid adsorbent and heat transfer tubes and sealed with a refrigerant, an evaporator, a condenser and pipe lines connecting the adsorption columns to the evaporator and condenser so that the refrigerant may be circulated, wherein sequential adsorption and desorption operations are conducted alternately between at least one of the adsorption columns and the others to produce continuously refrigerating power output in such a manner that a heating medium for heating the adsorbent and a coolant are alternately routed through heat transfer tubes of each adsorption column in response to the adsorption stage and desorption stage; and when the adsorption stage and the desorption stage are reversed, whole amount of residual heat (from the heating medium, adsorbent, heat transfer tubes, etc.) remained in a first adsorption column immediately before shifting from desorption stage to adsorption stage is transferred to heat transfer tubes of a second adsorption column immediately before coming into desorption stage to preheat the adsorbent therein, thus preventing a waste of heat quantity and, when preheating has been finished, refluxing the heating medium to a heat source side thereby to minimize its waste portion which is discarded to a cooling water generator such as a cooling tower.

According to another aspect of this invention, an adsorption refrigerating system is provided which comprises a plurality of adsorption columns each housing therein a solid adsorbent and heat transfer tubes and sealed with a refrigerant, an evaporator, a condenser and pipe lines connecting shells of the adsorption columns to the condenser and the evaporator, the pipe lines being equipped midway with valves that allow the refrigerant to circulate through the adsorption columns, the valves being capable of opening or closing by reason of internal pressure difference between the evaporator side and condenser side, whereby adsorption stage and desorption stage are reversed alternately between the one adsorption column(s) and the other column(s) without any heat loss to perform refrigerating operation continuously.

In the adsorption refrigeration system described above, preferably, the evaporator is constructed so that a plurality of heat transfer tubes for passing therethrough the heat transfer medium are horizontally housed in a multiple-stage arrangement in the vessel thereof, evaporating dishes holding refrigerant liquid are each arranged horizontally below each stage of heat transfer tubes, and overflow pipes are provided upright at the bottom of each evaporating dish which serve to adjust the liquid level so that the heat transfer tubes may always be immersed partly in the liquid and to cause excess liquid to flow down of itself to the next lower stage of evaporating dish, in turn. By this construction, brisk ebullition of the refrigerant is ensured, and consequently, the cooling efficiency of the evaporator is augmented.

DETAILED DESCRIPTION OF THE INVENTION

Figure 1:
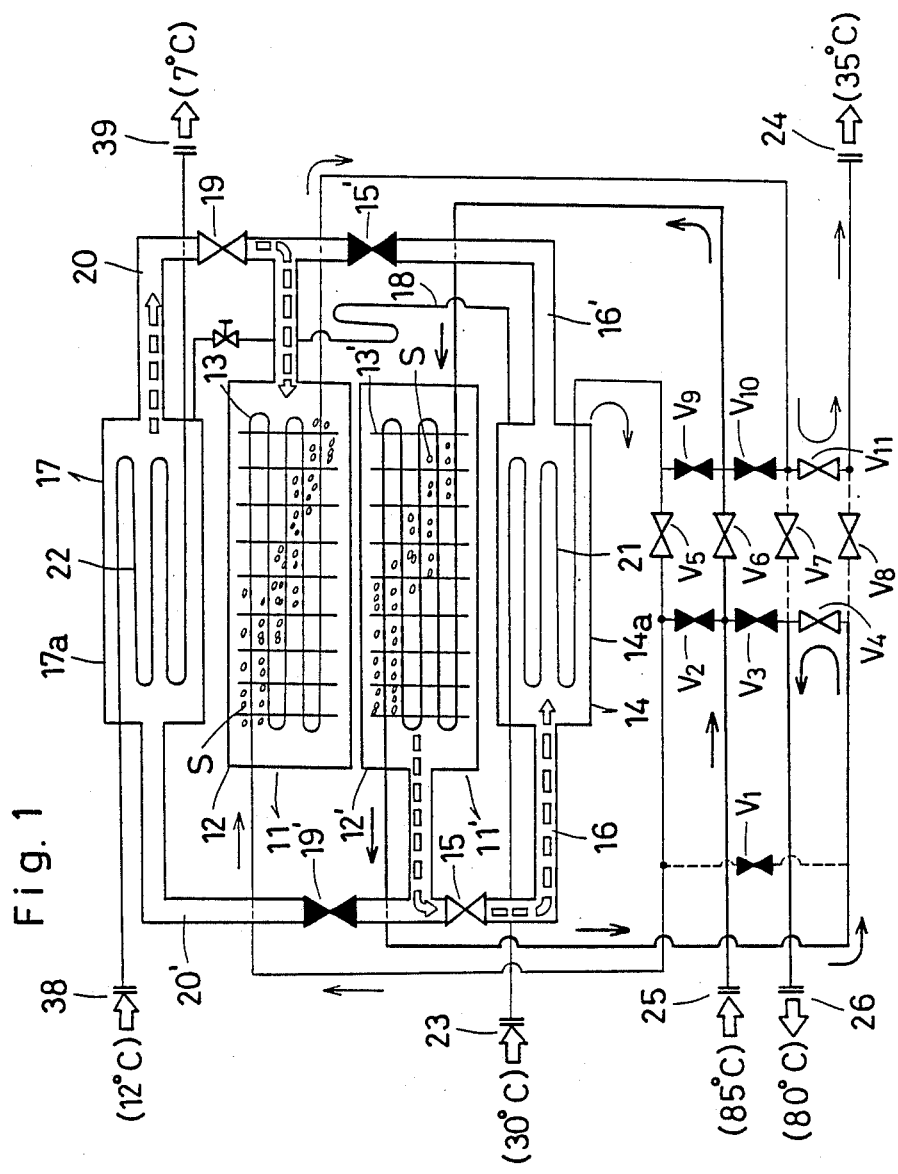
FIG. 1 to FIG. 5 are each a schematic illustration showing one example of adsorption refrigeration system to which operation method of this invention is applicable.

The adsorption refrigeration system to which this invention is applicable, as shown in FIG. 1 to FIG. 5, comprises a plurality of adsorption columns 11, 11', each housing therein a solid adsorbent S and heat transfer tubes 13, 13', a condenser 14, an evaporator 17 and ducts 16, 16', 20, 20' connecting shells 12, 12' of the adsorption columns 11, 11' to the condenser 14 and the evaporator 17 through valves 15, 15', 19, 19' that allow a refrigerant to circulate therethrough.

The system is run so that the adsorption columns 11, 11', ... are operated in such a manner that at least one of them is at a different stage from the others. A heat transfer medium for heating the adsorbent, etc. remaining in the heat transfer tubes 13' of the adsorption column 11' immediately before shifting from a desorption stage to an adsorption stage, is transferred to the heat transfer tubes 13 of the adsorption column 11 immediately before shifting from an adsorption stage to a desorption stage, to preheat the adsorbent S, and at the time when the overall amount of the residual heat transfer medium is passed through the heat transfer tubes 13 and preheating is finished, the adsorption columns 11, 11' are reversed, namely, the one adsorption column 11 is changed over to a desorption stage while the other adsorption column 11' is changed over to an adsorption stage, whereby the adsorption-and-desorption cycle is repeated.

According to the system of this invention, shortly before one adsorption column 11' is changed over from a desorption stage to an adsorption stage, the heat transfer medium for heating the adsorbent S, remaining within the heat transfer tubes 13' of the adsorption column 11', is transferred to the heat transfer tubes 13 of the other adsorption column 11, just before it changes into a desorption stage from an adsorption stage, to preheat the solid adsorbent S and, thereafter, the flow path is reversed to feed the heat transfer medium; and after the adsorption column 11 changes into a desorption stage, substantially the whole amount of the heat transfer medium, which has preheated the solid adsorbent, is refluxed to the heat source side without going to a cooling tower. As a consequence, heat loss is significantly diminished, and the amount of the heat transfer medium flowing toward a cooling water generator, such as cooling tower, is minimized, so that a packing material within the cooling water generator can be protected.

Figure 7:
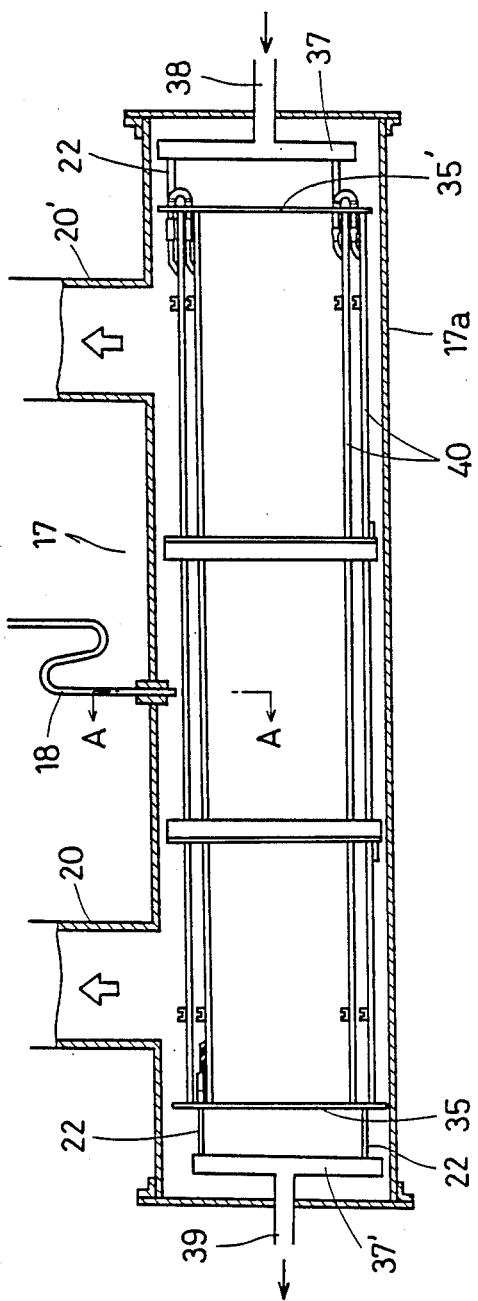
FIG. 7 is a side sectional view showing one example of an evaporator which can be used for the adsorption refrigeration system pertaining to this invention.
Figure 8:
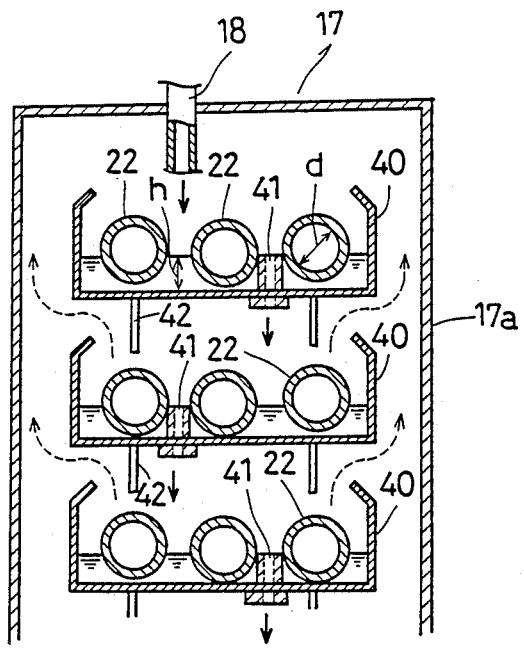
FIG. 8 is an enlarged sectional view taken on line A—A of FIG. 7.

The evaporator 17 preferably comprises, as shown in FIGS. 7 and 8, a plurality of heat transfer tubes, for routing therethrough the heat transfer medium arranged horizontally in a multiple-stage arrangement within its vessel 17a, flat evaporating dishes 40 for holding and storing a refrigerant liquid which are each arranged below each stage of the heat transfer tubes 22, and overflow pipes 41 arranged vertically at the bottom of each evaporating dish 40 which serve to adjust the liquid level so that the heat transfer tubes may always be immersed partly in the liquid and to cause excessive liquid to flow down of itself to the next stage of the evaporating dish 40.

With the refrigerating system provided with the foregoing evaporator 17, when a refrigerant liquid is passed from the condenser 14 into the uppermost stage of the evaporating dish 40 in the shell 17a of evaporator 17, the heat transfer tubes 22 in the uppermost dish are immersed, at their lower parts, in the liquid in a required depth, with excessive refrigerant liquid flowing down through the overflow pipes 41 to the lower stages of the evaporating dishes 41 in turn, until the lowermost evaporating dish 40 has been filled with the liquid. At this time, the liquid level in all the dishes reaches a required depth, and accordingly, the respective heat transfer tubes 22 are immersed in the liquid at their lower parts on an equal liquid level with each other. Then, the vessel 12 or 12' of the adsorption column 11 or 11' and the shell 17a of the evaporator 17 are put into communication with each other and the adsorbent S in the adsorption column 11 or 11' is cooled thereby to perform adsorption action. Concurrently, when a heating medium on a utilization side is routed through the heat transfer tubes 22 in the evaporator 17, a vigorous ebullition occurs on the surfaces of the heat transfer tubes 22 with which the refrigerant liquid L is in contact and refrigerant splashes are deposited on the exposed portions of the heat transfer tubes 22 in a thin film state. The deposited liquid film is evaporated on the surfaces of the heat transfer tubes 22 to remove the latent heat for evaporation from them, whereby the heating medium flowing through the heat transfer tubes 22 is cooled efficiently.

The adsorption refrigeration system stated above and a method of operating it will be hereinbelow described in more detail with reference to FIG. 1 to FIG. 5.

In these figures, flow paths through which a heat transfer medium or a refrigerant flows or doesn't flow are shown by a solid line or dotted line, respectively.

The first and second adsorption columns 11, 11' house finned tubes 13, 13' in their vacuum vessels 12, 12' which have a solid adsorbent S such as silica gel, zeolite, activated charcoal, activated alumina, etc. packed in fin interstices thereof. Through the finned tubes 13, 13', warm water supplied from a low-grade heat source, such as solar heat collectors, works' waste heat, etc., through a heat exchanger, or directly, and a cooling water produced in a cooling water generator, e.g. a cooling tower, are passed alternatively.

The condenser 14 is connected via ducts 16, 16', equipped with valves 15, 15', to the vessels 12, 12' of the adsorption columns 11, 11'.

The evaporator 17 is connected via a piping 18, in a trap form, to the bottom of a condenser casing 14a.

The evaporator shell 17a and the vacuum vessel 12 of the first adsorption column 11, and the vacuum vessel 12' of the second adsorption column 11' are coupled to each other, respectively, through the ducts 20, 20', equipped midway with the valves 19, 19'. Thus, a required amount of a refrigerant, e.g. water sealed in the vessels 12, 12' is adapted to be circulated in response to the opening and closing manipulations of the valves 15, 15', 19, 19' between the condenser 14 and the evaporator 17.

The condenser 14 houses, in the shell 14a, finned heat transfer tubes 21, e.g. cross-fin tubes or aerofin tubes, through which cooling water is adapted to be always routed to condense and liquefy the refrigerant vapor driven off from the solid adsorbent S within the adsorption columns 11, 11' and the refrigerant liquid collected and stored at the bottom of the shell 14a is supplied through the piping 18 to the evaporator 17.

On the other hand, the evaporator 17 incorporates, in the laterally elongated casing 17a, heat transfer tubes 22 for passing therethrough a utilization side heat transfer medium and the evaporating dishes 40 located below the heat transfer tubes 22, as shown in FIG. 8.

The refrigerant liquid introduced from the condenser 14 to the evaporator 17 is stored in the evaporating dishes 40 and evaporated and gasified on the surfaces of the heat transfer tubes 22 to remove evaporation latent heat from the utilization side heat transfer medium, thereby cooling it.

Valves $V_1$, $V_2$, $V_3$, ..., $V_{11}$ are provided in pipe lines linking the heat transfer tubes 13, 13' of the adsorption columns 11, 11', heat transfer tubes 21 of the condenser 14, a cooling water inlet 23, a cooling water outlet 24, a heat transfer medium inlet 25 on the heat source side, and a heat transfer medium outlet 26 on the heat source side, and are adapted to be opened or closed sequentially according to the directions of a control means (not shown).

Figure 6:
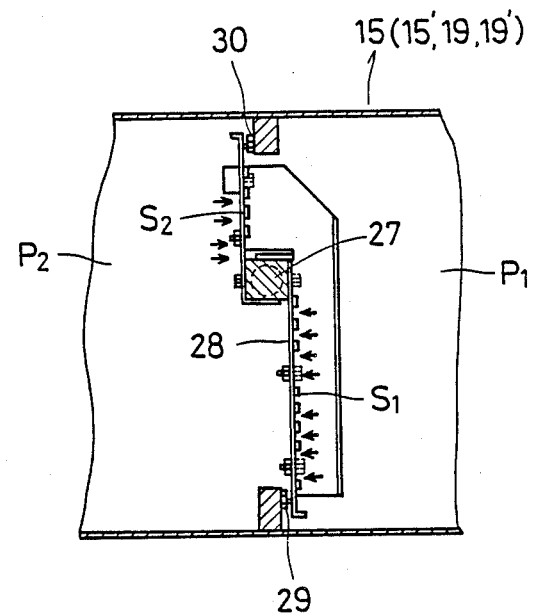
FIG. 6 is a side cross-sectional view showing one example of a butterfly valve which can be used for the adsorption refrigeration system pertaining to this invention.

The valves 15, 15', 19, 19' provided at the ducts 16, 16' linking the adsorption columns 11, 11' and the condenser 14 and evaporator 17 are formed as butterfly valves 28 as shown in FIG. 6 which have a support shaft 27 at its eccentric position.

The butterfly valves 28 are formed so that the back face of a valve seat portion on a packing 29 on the condenser side has a larger area ($S_1$) than that of a valve seat portion on a packing 30 on the evaporator side ($S_2$) and is adapted to open or close in response to the pressure difference between an internal pressure $P_1$ on the condenser side and an internal pressure $P_2$ on the evaporator side. The support shaft 27 is equipped, at its outer projecting end, with an output shaft for a reversible air motor (not shown) operating by reason of pneumatic pressure so that it serves to perform a fixing action of the butterfly valve 28 at its open and closed positions, opening and closing actions of the butterfly valve 28 in an emergency, or an action imparting a rotating force in a required valve-closing direction to the butterfly valve 28.

In the embodiment shown in FIGS. 7, 8, the evaporator 17 houses, in the insulated, laterally elongated casing 17a, a plurality of the heat transfer tubes 22, both ends of which are supported by tube plates 35, 35', and which are arranged horizontally constituting multiple-rows and multiple-stages. Each of the heat transfer tubes 22 is connected, at its ends, to an inlet tube 38 and an outlet tube 39 through a manifold 37, 37' and each stage of heat transfer tubes are provided horizontally with the evaporating dishes 40 covering the lower faces thereof.

The evaporating dish 40 is configured to be inclined inwardly at its longitudinal edges in order that refrigerant splashing effervescingly on the surfaces of the heat transfer tubes 22 may not be blown or flown out of the evaporating dish 40. The evaporating dishes 40 are each provided vertically, at their bottom, with an overflow pipe 41 which serves to keep the storage amount of the refrigerant constant in a mutually staggered orientation.

Each overflow pipe 41 is determined to have a height (h) from the bottom of the evaporating dish 40 within a range of $\frac{1}{8}$ d to 1 mm, preferably, $\frac{1}{8}$ d to 1/5 d wherein d designates an outside diameter of the heat transfer tube 22. The total amount of the refrigerant to be received in all the evaporating dishes is determined to be a minimum limit necessary under definite operating conditions.

In cases where the refrigerant amount becomes excessive, owing to alteration of the operating conditions, and the refrigerant drops down onto the bottom of the casing 17a and stagnates, the excessive refrigerant liquid is either evaporated wholly by the provision of a refrigerant-heating means such as a heater or a warm water tank at the bottom of the casing 17a or refluxed by being pumping up to the uppermost stage of evaporating dish 40.

The evaporating dishes 40 are each provided, at their marginal portions, with baffle plates 42 for preventing the refrigerant liquid from splashing, which plates are suspended vertically downwardly from the lower face of each evaporating dish.

In another embodiment (not shown), the evaporator may be constructed so that the evaporating dishes are defined at their marginal or sidewall portions with overflow openings for allowing excessive refrigerant liquid to flow down to the lower evaporating dishes, instead of providing the overflow pipes.

In a further embodiment (not shown), the evaporator comprises a plurality of finned heat transfer tubes for routing therethrough a heat transfer medium on a utilization side which tubes are vertically installed in the shell of the evaporator so that the fins may be horizontally located in a multi-stage arrangement, all or every several stages of the fins forming evaporating dishes. The evaporating dishes have each an angled marginal portion defined with overflow openings or slots.

OPERATION

In the state shown in FIG. 1, the first adsorption column 11 is supplied with a cooling water and performs an adsorption operation while the second adsorption column 11' is supplied with a heat transfer medium on the heat source side and performs desorption operation.

The heat transfer medium on the heat source side introduced from the inlet 25 is admitted through the valve $V_6$ to the heat transfer tubes 13' in the second adsorption column 11', where it heats and desorbs the solid adsorbent S, flows through the valve $V_4$ to the outlet 26 for the heat transfer medium on the heat source side and returns to the heat source.

The refrigerant vapor heated and desorbed in the second adsorption column 11' is admitted through the valve 15 into the condenser 14, where it is cooled and liquefied by the cooling water flowing through the heat transfer tubes 21, collected at the bottom of the shell 14a, and transferred through the piping 18 by reason of pressure difference, etc. to the evaporator 17. During this time, in the first adsorption column 11, the cooling water is introduced from the heat transfer tube 21 of the condenser 14 via the valve $V_5$ to the heat transfer tubes 13, and the solid adsorbent S is cooled to adsorb the refrigerant vapor. The refrigerant liquid within the evaporator 17 is evaporated vigorously from the surfaces of the heat transfer tubes 22 and removes the evaporation latent heat of the heat transfer medium on the utilization side flowing through the heat transfer tubes to cool it. Consequently, the utilization side heat transfer medium thus cooled can be supplied to a fan coil unit installed at an air conditioning space area, whereby it is possible to satisfy general temperature conditions of an air conditioning system (e.g., cooling water inlet temperature: 30° C., inlet temperature of utilization side heat transfer medium: 12° C., outlet temperature of it: 7° C.).

Here, where the evaporator 17 is constructed as shown in FIG. 7, vigorous ebullition of the refrigerant occurs on portions of the heat transfer tubes 22 with which the refrigerant makes contact and refrigerant splashes are deposited on exposed portion of the heat transfer tubes 22, forming an uniform liquid film which is rapidly evaporated off from the surfaces of the heat transfer tubes 22. In this way, the heat transfer tubes 22 are efficiently cooled.

Figure 2:
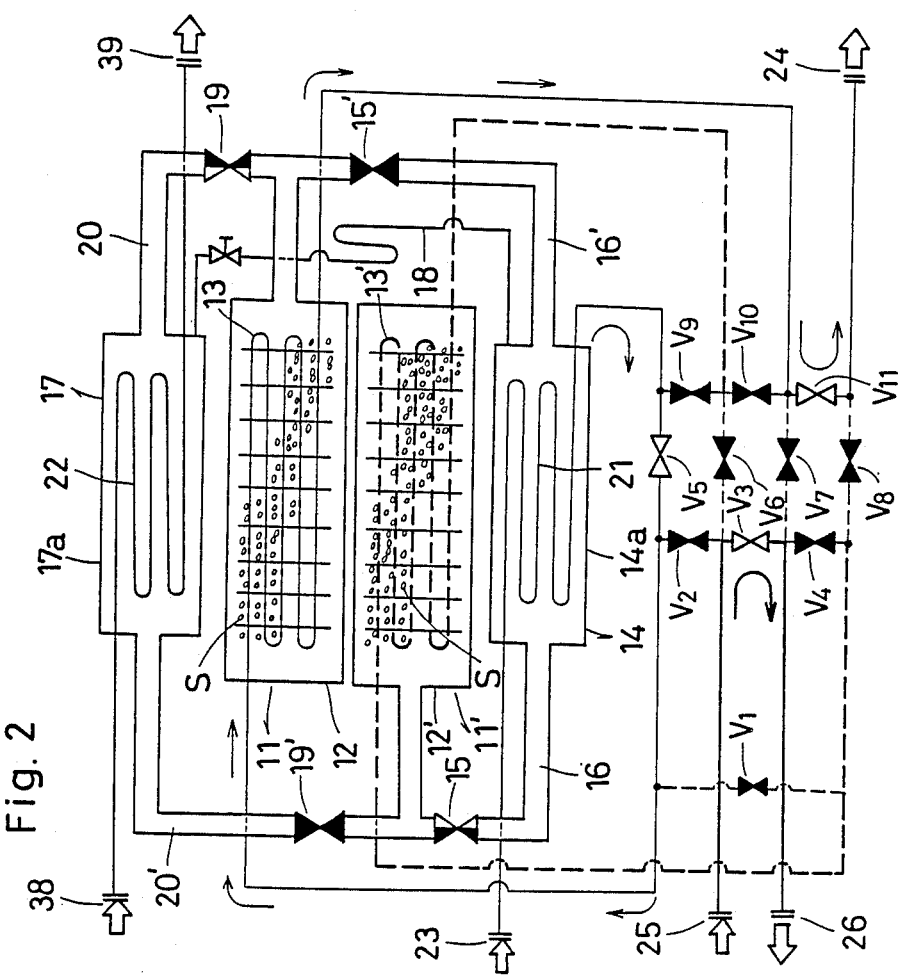

In changing over the adsorption and desorption stages of the adsorption columns 11, 11' from the operation state of FIG. 1 to the state of FIG. 2, first, the valves $V_1$, $V_2$, $V_5$, $V_7$-$V_{11}$ remain unchanged and the valves $V_3$, $V_4$, $V_6$ are changed over at a time as shown in FIG. 2, whereby the heat transfer medium on the heat source side from the inlet 25 is bypassed through the valve $V_3$ to the outlet 26 thereby to shut off supply of the heating medium on the heat source side to the second adsorption column 11'. By this changeover, residual warm water is confined in the heat transfer tubes 13' of the second adsorption column 11' At this time, the adsorption stage in the first adsorption column 11 comes to an end and the desorption stage in the second adsorption column 11' is shortly prior to its termination, and consequently, the valves 15, 19 provided at the ducts 16, 20 are in a half-opened state in response to a pressure difference.

Figure 3:
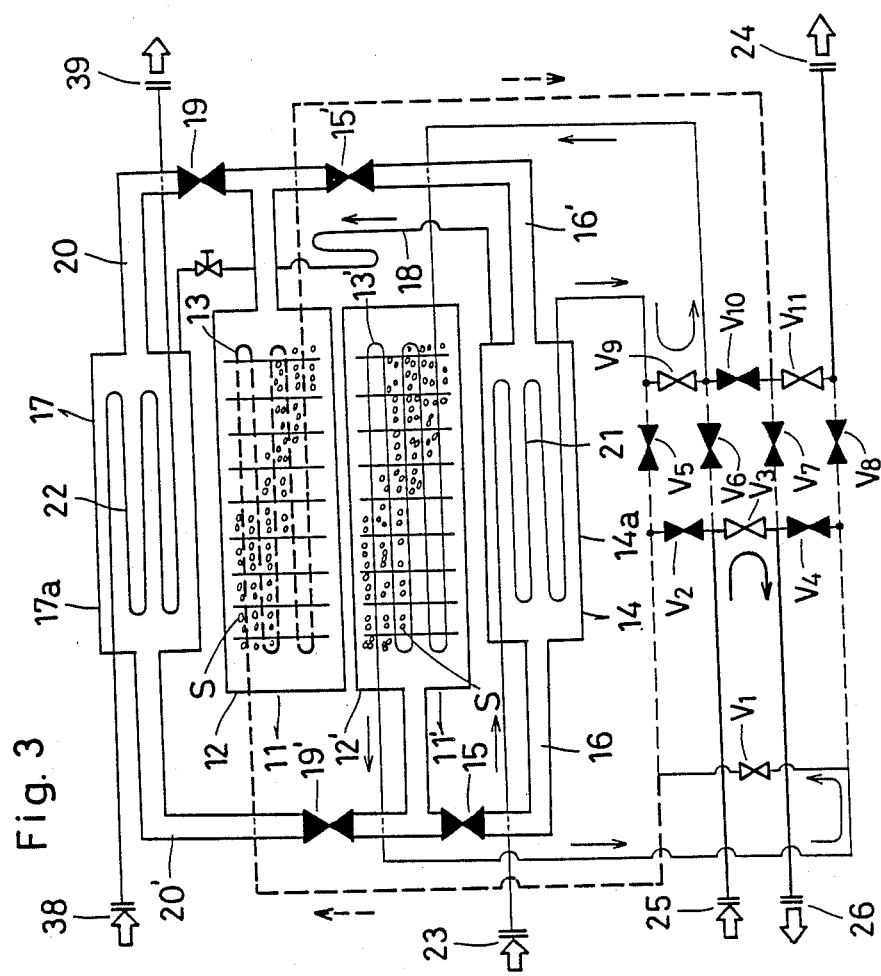

Further, when the valves $V_1$, $V_5$, $V_9$ are changed over at a time as the valves $V_2$, $V_3$, $V_4$, $V_6$, $V_7$, $V_8$, $V_{10}$, $V_{11}$ are as shown in FIG. 3, the warm water remaining in the heat transfer tubes 13' in the second adsorption column 11' is forced out by the cooling water supplied to the heat transfer tubes 21 in the condenser 14 and introduced via the valve $V_1$ into the heat transfer tubes 13 in the first adsorption column 11. As a consequence, the solid adsorbent S in the first adsorption column 11 is preheated by the warm water immediately before entering into a desorption stage, concurrently with which the refrigerant collected in the shell 14a of the condenser 14 is introduced through the piping 18 to the evaporator 17.

In this case, if the operation in this state is continued, the residual warm water introduced in the first adsorption column 11 will flow out of the outlet 24 for cooling water because of the cooling water introduced in the second adsorption column 11'. For this reason, the flow of the residual warm water is temporarily stopped at a suitable time by changing over the valves $V_1$, $V_8$, $V_1$ as shown in FIG. 4 and the cooling water flowed out of the heat transfer tubes 13' in the second adsorption column 11' can be transferred through the valve $V_8$ to the outlet 24 for cooling water.

With this change-over, an adsorption stage is initiated in the second adsorption column 11' by the cooling of the solid adsorbent S and the refrigerant in the evaporator 17 is evaporated to cool the heating medium on the utilization side substantially continuously.

Figure 4:
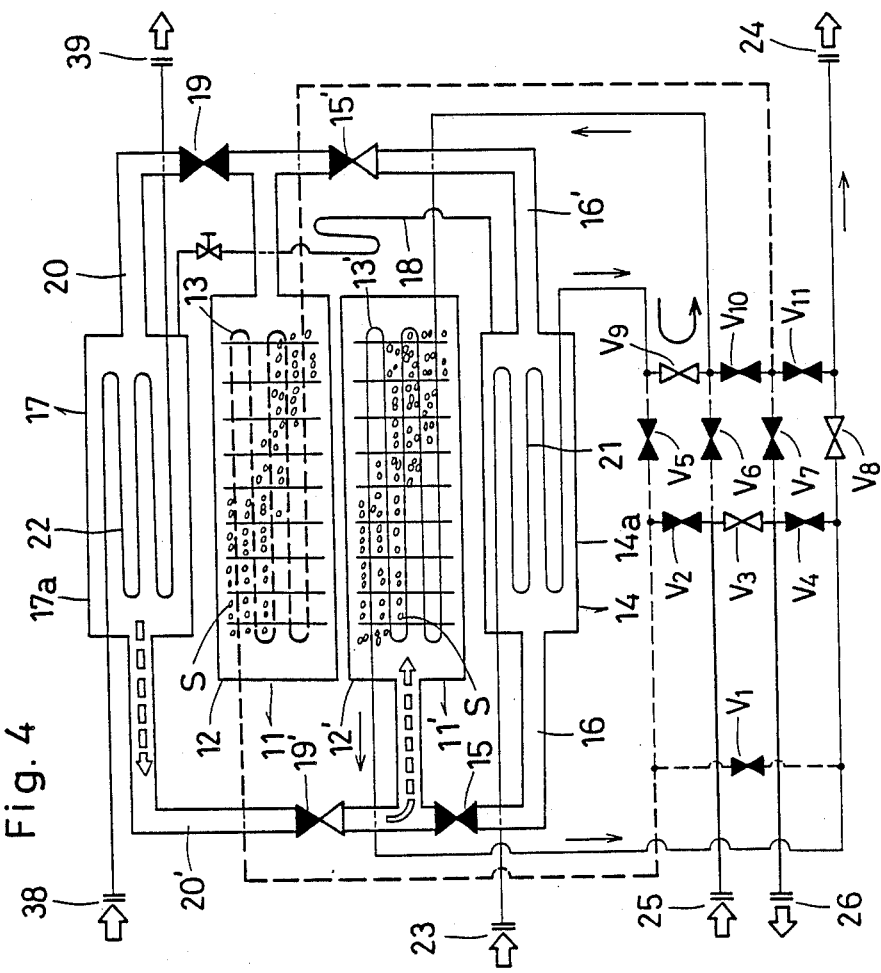

The timing of changing over the valves $V_1$, $V_8$, $V_{11}$ from the state of FIG. 3 to the state of FIG. 4 is controlled usually by a timer in response to the pressure feed rate of cooling water. It is also possible to regulate the valves by sensing the passage of warm water through a temperature sensor provided midway on the piping.

Figure 5:
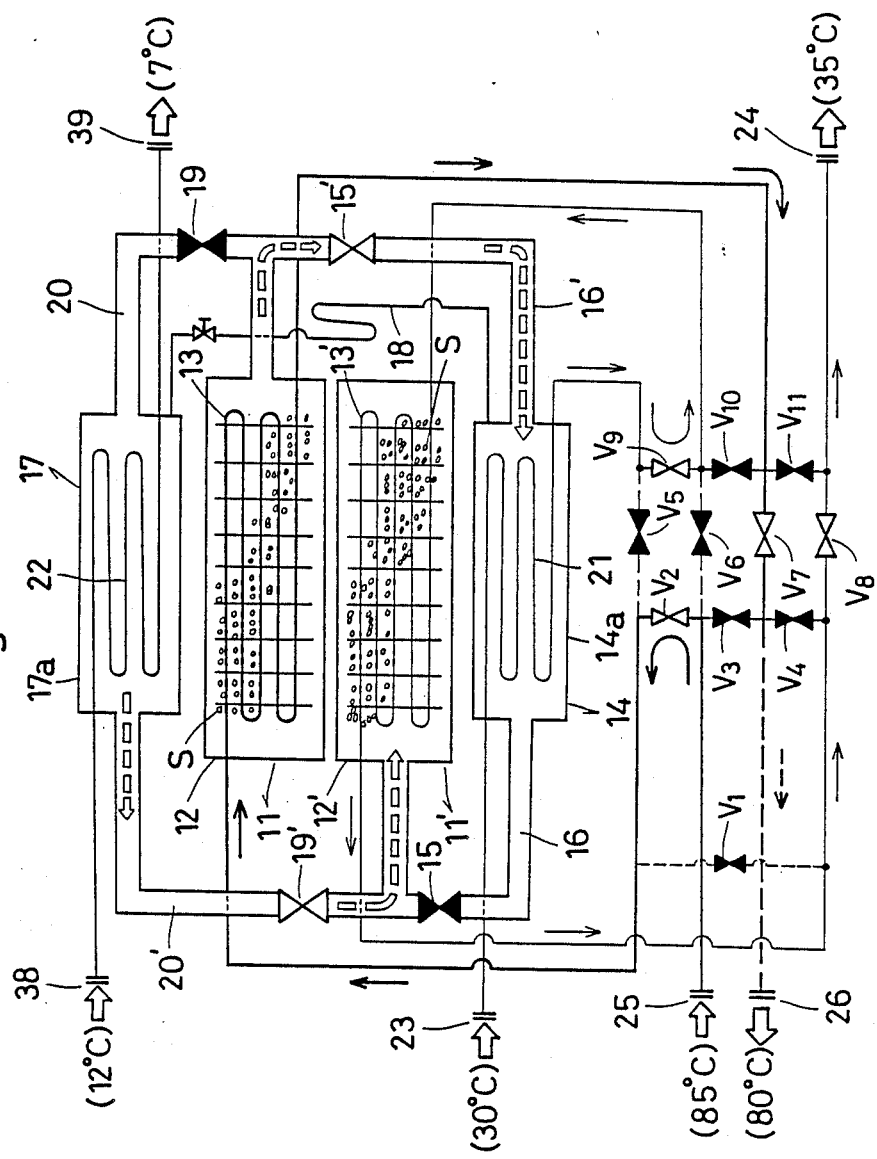

The valves $V_2$, $V_3$, $V_7$ are changed over from the state shown in FIG. 4 to the state shown in FIG. 5 in order to feed the first adsorption column 11 with the heating medium on the heat source side.

The heating medium on the heat source side admitted from the inlet 25 is flowed through the valve $V_2$ into the heat transfer tubes 13 in the first adsorption column 11 and, while urging the residual warm water for preheating of adsorbent which is stagnated in the heat transfer tubes 13 out, passes through the valve $V_7$ toward the outlet 26 for the heating medium on the heat source side. The residual warm water is refluxed to heat exchangers on the heat source side and accordingly, heat loss of the warm water is prevented. Further, flowing of the warm water on the cooling tower side is prevented, whereby early degradation of the packing material is impeded.

Thus, the first adsorption column 11 shifts from an adsorption stage through a preheating stage and comes into a desorption stage. At the desorption stage, refrigerant vapor driven off from the solid adsorbent S is routed through the valve 15' and the duct 16' into the condenser 14 where it is condensed and liquefied.

Upon reversing the first adsorption column 11 and the second adsorption column 11' from this state (FIG. 5) to the state shown in FIG. 1 between adsorption stage and desorption stage, the residual warm water in the adsorption column 11 is used for preheating the adsorbent S in the second adsorption column 11' and then refluxed to the heat source side in a similar procedure to the preceding steps. Description of the manipulative procedure of the valves during the reversing process will be omitted, accordingly.

The example has been described so far wherein two adsorption columns are connected in parallel to a condenser and evaporator so that a refrigerant may be circulated, but this invention is applicable likewise to other examples wherein three or more adsorption columns are arranged in parallel, and adsorption and desorption operations are conducted sequentially among them whereby refrigerating output can be obtained.

In the case where three or more adsorption columns are brought into adsorption and desorption with timing lagging little by little, since the timing of mutually feeding or removing the residual warm water is deviated, a tank for accumulating residual warm water is installed at least at one place to temporarily store warm water therein. When the warm water thus stored is fed to the adsorption column shortly before shifting from an adsorption stage to a desorption stage, the preheating of the solid adsorbent and refluxing of warm water to the heat source are effected easily.

We claim:

1. In a method of operating an adsorption refrigerant system comprising a plurality of adsorption columns, each of which contains heat transfer tubes and the same solid absorbent; a condenser; an evaporator; and pipelines equipped with valves connecting said adsorption columns with said evaporator and condenser so that a refrigerant may be circulated therethrough, the improvement comprising operating each of said plurality of adsorption columns in such a manner that it alternates between an adsorption stage and a desorption stage and at least two of said adsorption columns are at different stages at the same time; supplying a heat transfer medium to the heat transfer tubes of one of said at least two adsorption columns during its desorption stage and a coolant to the heat transfer tubes of another of said at least two adsorption columns during its adsorption stage; immediately preceding the termination of said desorption stage in said one adsorption column and said adsorption stage in said another adsorption column, transferring the heat transfer medium contained in the heat transfer tubes of said one adsorption column to the heat transfer tubes of said another absorption column to preheat the adsorbent contained therein; and switching said one adsorption column to said adsorption stage and said other adsorption column to said desorption stage.

2. The method of claim 1, wherein residual heat transferred to said another adsorption column shortly before shifting from said adsorption stage to said desorption stage is forced out by means of a heat transfer medium on a heat source side fed to said another column from a heat source and is refluxed to the heat source side.

3. The method of claim 1, wherein at the time when said adsorption stage and desorption stage are changed over, said refrigeration system is operated in a state that all of said valves connecting said adsorption columns to said evaporator and said condenser are fully closed.

4. The method of claim 1, wherein said refrigeration system contains only one evaporator and one condenser.

5. The method of claim 1, wherein said heat transfer medium and said coolant are the same substance.

6. The method of claim 5, wherein the same heat transfer medium and coolant are used in each of said plurality of adsorption columns.

7. The method of claim 1, wherein the same refrigerant is circulated through said plurality of adsorption columns.

8. An adsorption refrigeration system comprising a plurality of adsorption columns, each of which contains heat transfer tubes and the same solid adsorbent; a single evaporator; a single condenser; and pipelines equipped with valves connecting said adsorption columns with said evaporator and condenser so that a refrigerant may be circulated therethrough, each of said valves having a driving support shaft at an eccentric position thereof and valve means having different areas on both sides thereof and being capable of opening or closing by means of an internal pressure difference between the evaporator and one of said plurality of adsorption columns and the condenser and another of said plurality of adsorption columns; wherein said plurality of adsorption columns are adapted to alternate between an adsorption stage and a desorption stage and at least two of said adsorption columns are at different stages at the same time.

9. An adsorption refrigeration system as claimed in claim 8, wherein said valves are butterfly valves.

10. An adsorption refrigeration system as claimed in claim 8, wherein said evaporator comprises a plurality of heat transfer tubes for routing therethrough a heat transfer medium, on a utilization side thereof, which are horizontally installed in multi-stage arrangement in a shell of the evaporator; a plurality of evaporating plates for storing refrigerant liquid therein which are each disposed horizontally below each stage of heat transfer tubes; and overflow pipes, each overflow pipe being provided upright at the bottom of said evaporating plate and serving to adjust the level of said refrigerant liquid so that said heat transfer tubes may always be partially immersed in a refrigerant liquid and allow excessive refrigerant liquid to flow of itself down to lower stages of said evaporating plates.

11. An adsorption refrigeration system as claimed in claim 8, wherein said evaporator comprises a plurality of heat transfer tubes for routing therethrough a heat transfer medium, on a utilization side thereof, which are horizontally installed in multi-stage arrangement in a shell of the evaporator and a plurality of evaporating plates for storing refrigerant liquid therein which are each disposed horizontally below each stage of heat transfer tubes, said evaporating plates each being defined, in the marginal portion thereof, with overflow openings which serve to adjust the level of said refrigerant liquid so that said heat transfer tubes may always be partially immersed in said refrigerant liquid and allow excessive refrigerant liquid to flow of itself down to lower stages of evaporating plates.

12. An adsorption refrigeration system as claimed in claim 8, wherein said evaporator comprises a plurality of finned heat transfer tubes for routing therethrough heat transfer medium, on a utilization side thereof, which tubes are vertically installed in a shell of the evaporator so that the fins may be horizontally arranged in a multi-stage fashion, all every several stages of said fins being formed with an angled marginal portion, thus forming evaporating plates being defined at the marginal portions, with overflow openings which serve to adjust the level of said refrigerant liquid and allow excessive refrigerant liquid to flow of itself down to lower stages of the evaporating plates.

13. An adsorption refrigeration system as claimed in claim 10, wherein said evaporating plates each have inwardly inclined top edges at their sidewalls along longitudinal direction of said heat transfer tubes, and are provided, at their marginal portions, with baffle plates for preventing said refrigerant liquid from splashing, said baffle plates being suspended vertically downwardly from the lower bottom of each evaporating plate.

14. An adsorption refrigeration system as claimed in claim 13, wherein said overflow pipes are provided upright on the upper face of each evaporating plate in a height adjusted to such a level of the refrigerant liquid in said evaporating plate that said heat transfer tubes may be immersed in said refrigerant liquid in a depth range of from ½ of their outside diameter to 1 mm.

15. An adsorption refrigeration system consisting essentially of a plurality of adsorption columns, each housing therein a solid adsorbent and heat transfer tubes and having a refrigerant sealed therein; a single evaporator; a single condenser; and pipelines equipped with valves connecting said adsorption columns with said evaporator and condenser so that a refrigerant may be circulated therethrough, each of said valves being capable of opening or closing by means of an internal pressure difference between the evaporator and one of said plurality of adsorption columns and the condenser and another of said plurality of adsorption columns; wherein said plurality of adsorption columns are adapted to operate between an adsorption stage and a desorption stage and at least two of said adsorption columns are at different stages at the same time.

* * * * *

UNITED STATES PATENT AND TRADEMARK OFFICE
CERTIFICATE OF CORRECTION

PATENT NO. : 4 881 376

DATED : November 21, 1989

INVENTOR(S) : Yasuo YONEZAWA et al

It is certified that error appears in the above-identified patent and that said Letters Patent is hereby corrected as shown below:

Column 9, line 1; change "refrigerant" to
              ---refrigeration---.

Signed and Sealed this

Twenty-first Day of May, 1991

*Attest:*

HARRY F. MANBECK, JR.

*Attesting Officer*      *Commissioner of Patents and Trademarks*